(12) United States Patent
Rooyen et al.

(10) Patent No.: US 7,433,659 B2
(45) Date of Patent: Oct. 7, 2008

(54) ITERATIVE MULTI-STAGE DETECTION TECHNIQUE FOR A DIVERSITY RECEIVER HAVING MULTIPLE ANTENNA ELEMENTS

(75) Inventors: Pieter van Rooyen, San Diego, CA (US); Danie van Wyk, Gauteng (ZA)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/695,375

(22) Filed: Apr. 2, 2007

(65) Prior Publication Data
US 2007/0171963 A1 Jul. 26, 2007

Related U.S. Application Data

(62) Division of application No. 10/650,478, filed on Aug. 28, 2003, now Pat. No. 7,215,934.

(60) Provisional application No. 60/407,524, filed on Aug. 28, 2002.

(51) Int. Cl.
H04B 17/02 (2006.01)
H04B 1/00 (2006.01)

(52) U.S. Cl. .................. 455/133; 455/103; 455/131; 455/137; 370/208; 375/148

(58) Field of Classification Search .................. 455/131, 455/130, 132–138, 101–103, 9–10, 13.3, 455/15–25, 67.11–67.13, 500–504, 513, 455/62, 63.1–63.4, 560, 562.1; 370/148, 370/342–343, 347, 355; 375/208, 310, 335, 375/342, 441, 130
See application file for complete search history.

(56) References Cited

U.S. PATENT DOCUMENTS 5,887,021 A * 3/1999 Keskitalo et al. ............ 375/144

| 6,289,039 | B1 * | 9/2001 | Garodnick | 375/143 |
|---|---|---|---|---|
| 6,351,500 | B2 | 2/2002 | Kumar | |
| 6,369,758 | B1 | 4/2002 | Zhang | |
| 6,473,467 | B1 | 10/2002 | Wallace et al. | |
| 6,512,737 | B1 | 1/2003 | Agee | |
| 6,680,966 | B2 * | 1/2004 | Lemois et al. | 375/141 |
| 2001/0050926 | A1 | 12/2001 | Kumar | |
| 2002/0009062 | A1 | 1/2002 | Proctor, Jr. et al. | |
| 2002/0024975 | A1 * | 2/2002 | Hendler | 370/535 |
| 2002/0054623 | A1 | 5/2002 | Wang et al. | |
| 2003/0016773 | A1 | 1/2003 | Atungsiri et al. | |
| 2003/0162566 | A1 | 8/2003 | Shapira et al. | |
| 2004/0038651 | A1 * | 2/2004 | Okuhata | 455/130 |

OTHER PUBLICATIONS

International Search Report for PCT/US03/26933, mailed Mar. 8, 2004.

* cited by examiner

*Primary Examiner*—Pablo N Tran
(74) *Attorney, Agent, or Firm*—McAndrews, Held & Malloy, Ltd.

(57) ABSTRACT

An iterative multistage detection system and method for orthogonally multiplexing K channels onto a signal processing chain using N orthogonal sequences of length N. The K channels include a first set of N channels and a second set of M channels (the M channels being separate and distinct from the N channels), where K=N+M. In a first iteration, interference from the first set of N channels imparted on the second set of M channels is removed from the multiplexed signal, thereby enabling the symbol values associated with the second set of M channels to be reliably estimated. In a second iteration, interference from the second set of M channels imparted on the first set of N channels is removed from the first set of N channels, thereby enabling the symbol values associated with the first set of N channels to be reliably estimated.

27 Claims, 12 Drawing Sheets

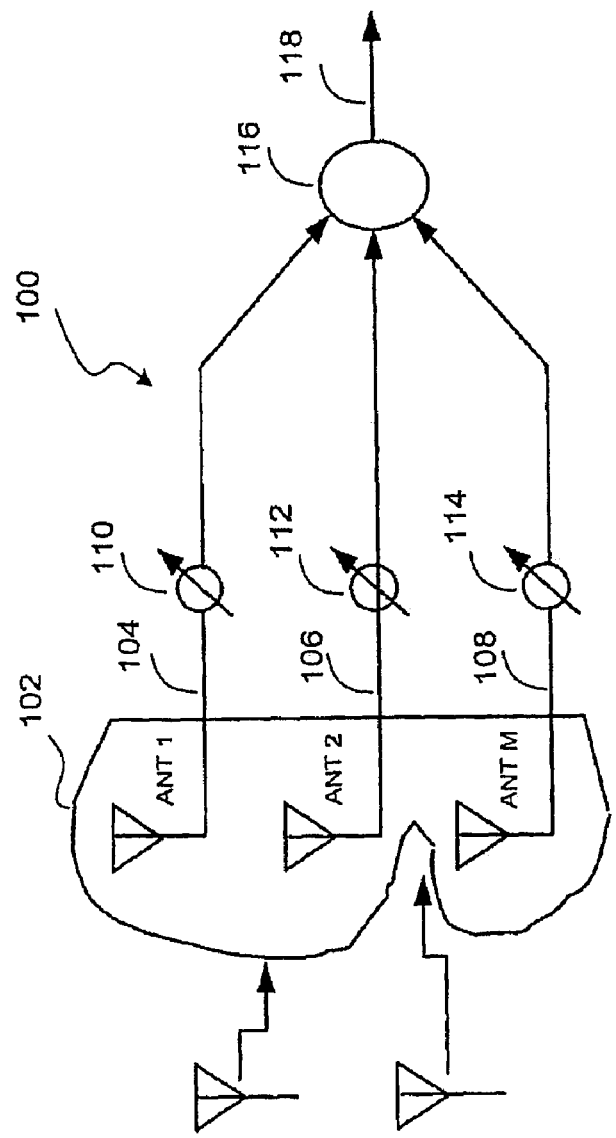
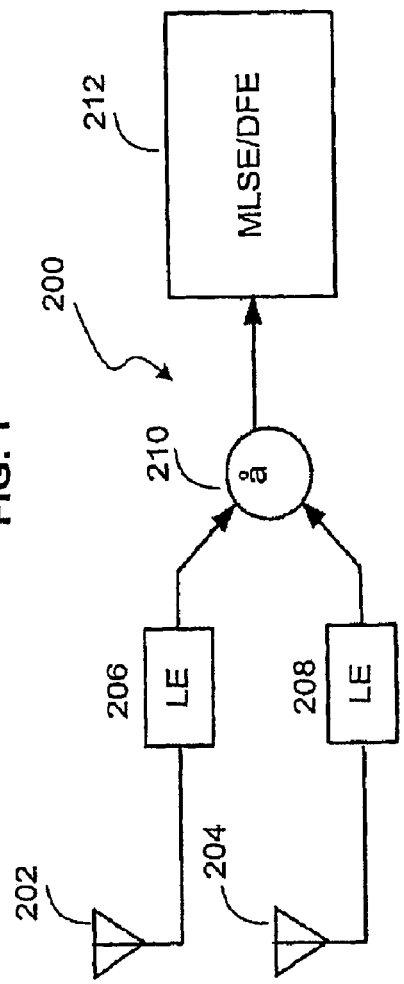
FIG. 1
FIG. 2

Simulation results with N=16, M=1

Simulation results with N=16, M=2

Simulation results with N=16, M=3

Simulation results with N=16, M=4

Simulation results with N=4, M=1

ITERATIVE MULTI-STAGE DETECTION TECHNIQUE FOR A DIVERSITY RECEIVER HAVING MULTIPLE ANTENNA ELEMENTS

CROSS-REFERENCE TO RELATED APPLICATION

This application is a divisional of U.S. application Ser. No. 10/650,478 filed Aug. 28, 2003, which claims priority under 35 U.S.C. §119(e) to U.S. Provisional Application No. 60/407,524 entitled ITERATIVE MULTI-STAGE DETECTION TECHNIQUE FOR DIVERSITY RECEIVER HAVING MULTIPLE ANTENNA ELEMENTS, filed Aug. 28, 2002, which is incorporated herein by reference in its entirety.

BACKGROUND OF THE INVENTION

1. Field of the Invention

The present invention relates to an antenna diversity receiver for radio communication systems, and more particularly to a multi-channel detection process implemented in a receiver receiving signals over multiple channels.

2. Background Information

It has recently been proposed that both the performance and capacity of existing wireless systems could be improved through the use of so-called "smart" antenna techniques. In particular, it has been suggested that such techniques, coupled with space-time signal processing, could be utilized both to combat the deleterious effects of multipath fading of a desired incoming signal and to suppress interfering signals. In this way both performance and capacity of digital wireless systems in existence or being deployed (e.g., CDMA-based systems, TDMA-based systems, WLAN systems, and OFDM-based systems such as IEEE 802.11a/g) may be improved.

It is anticipated that smart antenna techniques will be increasingly utilized both in connection with deployment of base station infrastructure and mobile subscriber units (e.g, handsets) in cellular systems in order to address the increasing demands being placed upon such systems. These demands are arising in part from the shift underway from current voice-based services to next-generation wireless multimedia services and the accompanying blurring of distinctions among voice, video and data modes of transmission. Subscriber units utilized in such next-generation systems will likely be required to demonstrate higher voice quality relative to existing cellular mobile radio standards as well as to provide high-speed data services (e.g., as high as 10 Mbits/s). Achieving high speed and high quality of service, however, is complicated because it is desireable for mobile subscriber units to be small and lightweight, and to be capable of reliably operating in a variety of environments (e.g., cellular/microcellular/picocellular, urban/suburban/rural and indoor/outdoor). Moreover, in addition to offering higher-quality communication and coverage, next-generation systems are desired to more efficiently use available bandwidth and to be priced affordably to ensure widespread market adoption.

In many wireless systems, three principal factors tend to account for the bulk of performance and capacity degradation: multipath fading, delay spread between received multipath signal components, and co-channel interference (CCI). As is known, multipath fading is caused by the multiple paths which may be traversed by a transmitted signal en route to a receive antenna. The signals from these paths add together with different phases; resulting in a received signal amplitude and phase that vary with antenna location, direction and polarization, as well as with time (as a result of movement through the environment). Increasing the quality or reducing the effective error rate in order to obviate the effects of multipath fading has proven to be extremely difficult. Although it would be theoretically possible to reduce the effects of multipath fading through use of higher transmit power or additional bandwidth, these approaches are often inconsistent with the requirements of next-generation systems.

As mentioned above, the "delay spread" or difference in propagation delays among the multiple components of received multipath signals has also tended to constitute a principal impediment to improved capacity and performance in wireless communication systems. It has been reported that when the delay spread exceeds approximately ten percent (10%) of the symbol duration, the resulting significant intersymbol interference (IS) generally limits the maximum data rate. This type of difficulty has tended to arise most frequently in narrowband systems such as the Global System for Mobile Communication (GSM).

The existence of CCI also adversely affects the performance and capacity of cellular systems. Existing cellular systems operate by dividing the available frequency channels into channel sets, using one channel set per cell, with frequency reuse. Most time division multiple access (TDMA) systems use a frequency reuse factor of 7, while most code division multiple (CDMA) systems use a frequency reuse factor of 1. This frequency reuse results in CCI, which increases as the number of channel sets decreases (i.e., as the capacity of each cell increases). In TDMA systems, the CCI is predominantly from one or two other users, while in CDMA systems there may exist many strong interferers both within the cell and from adjacent cells. For a given level of CCI, capacity can be increased by shrinking the cell size, but at the cost of additional base stations.

The impairments to the performance of cellular systems of the type described above may be at least partially ameliorated by using multi-element antenna systems designed to introduce a diversity gain into the signal reception process. There exist at least three primary methods of effecting such a diversity gain through decorrelation of the signals received at each antenna element: spatial diversity, polarization diversity and angle diversity. In order to realize spatial diversity, the antenna elements are sufficiently separated to enable low fading correlation. The required separation depends on the angular spread, which is the angle over which the signal arrives at the receive antennas.

In the case of mobile subscriber units (e.g, handsets) surrounded by other scattering objects, an antenna spacing of only one quarter wavelength is often sufficient to achieve low fading correlation. This permits multiple spatial diversity antennas to be incorporated within a handset, particularly at higher frequencies (owing to the reduction in antenna size as a function of increasing frequency). Furthermore, dual polarization antennas can be placed close together, with low fading correlation, as can antennas with different patterns (for angle or direction diversity).

Although increasing the number of receive antennas enhances various aspects of the performance of multi-antenna systems, the necessity of providing a separate RF chain for each transmit and receive antenna increases costs. Each RF chain is generally comprised of a low noise amplifier, filter, downconverter, and analog to digital to converter (A/D), with the latter three devices typically being responsible for most of the cost of the RF chain. In certain existing single-antenna wireless receivers, the single required RE chain may account for in excess of 30% of the receiver's total cost. It is thus apparent that as the number of receive antennas increases, overall system cost and power consumption may dramatically increase. It would therefore be desirable to provide a technique that effectively provides additional receive antennas without proportionately increasing system costs and power consumption.

SUMMARY OF THE INVENTION

In one embodiment, the invention can be characterized as a method, and means for accomplishing the method, for receiving a signal, the method including receiving K replicas of the signal, each of the K replicas being received by one of a corresponding K antennas so as to thereby generate K received signal replicas; processing each of the K received signal replicas using one of N orthogonal sequences, thereby generating K processed signal replicas, wherein N is less than K; orthogonally multiplexing the K processed received signal replicas into a multiplexed signal provided to a signal processing chain; downconverting, within the signal processing chain, the multiplexed signal into a baseband multiplexed signal; and transforming the baseband multiplexed signal into K separate signals wherein each of the K separate signals corresponds to one of the K replicas of the signal.

In another embodiment, the invention may be characterized as apparatus for receiving a signal comprising: K antenna elements, wherein the K antenna elements are arranged to receive one of a corresponding K replicas of the signal and thereby generate K received signal replicas; a signal processing chain; a first multiplexer configured to receive N of the K received signal replicas and generate a first set of N channel signals, wherein each of the N channel signals is spread according to a corresponding one of N orthogonal sequences and corresponds to one of the N received signal replicas; a second multiplexer configured to receive M of the K received signal replicas and generate a second set of M channel signals, wherein each of the M channel signals is spread according to one of the N orthogonal sequences and corresponds to one of the M received signal replicas; a summing portion coupled between the signal processing chain and the first and second multiplexers, wherein the summing portion is configured to combine the first set of N channel signals and the second set of M channel signals into a multiplexed signal and provide the multiplexed signal to the signal processing chain; a downconversion module configured to downconvert, within the signal processing chain, the multiplexed signal to a baseband multiplexed signal; and a signal recovery module coupled to the signal processing chain, wherein the signal recovery module is configured to receive the baseband multiplexed signal and provide K separate signals from the baseband multiplexed signal, wherein each of the K separate signals corresponds to one of the K replicas of the signal.

In a further embodiment, the invention may be characterized as a method for multiplexing K channels on to a receiver chain, the K channels including N channels corresponding to N antenna elements and M channels corresponding to M antenna elements the method comprising: spreading each of the N channels according to a corresponding one of N orthogonal sequences so as to form N spread channels; overlaying a first scrambling sequence on to the N spread channels so as to form a first set of N channels; spreading each of the M channels according to one of the N orthogonal sequences so as to form M spread channels; overlaying a second scrambling sequence on to the M spread channels so as to form a second set of M channels; combining the first set of N channels and the second set of M channels so as to form K multiplexed channels; and providing the K multiplexed channels to the receiver chain.

In yet another embodiment the invention may be characterized as a method for separating K symbol streams, each of the K symbol streams being conveyed by K respective orthogonally spread channels in a receiver chain, the K channels including a first set of N channels and a second set of M channels, each of the N channels being spread according to a corresponding one of N orthogonal sequences and each of the M channels being spread according to one of the N orthogonal sequences, the method comprising: despreading the first set of N channels so as to generate N separate channels; detecting, from the N separate channels, a set of N symbols wherein each of the N symbols is conveyed by a corresponding one of the N channels; generating a first interference signal due to the first set of N channels based upon the set of N symbols; subtracting the interference signal from the second set of M channels; despreading the second set of M channels so as to generate M separate channels; detecting, from the M separate channels, a set of M symbols wherein each of the M symbols is conveyed by a corresponding one of the M channels; and providing K separate symbols wherein the K separate symbols include the set of N symbols and the set of M symbols.

In yet a further embodiment, the invention may be characterized as a method for receiving a signal with an antenna array comprising: receiving K replicas of the signal, each of the K replicas being received by one of a corresponding K antenna elements of the antenna array, wherein the K replicas include N replicas and M other replicas of the received signal; multiplexing the N replicas and the M replicas of the signal into a multiplexed signal provided to a single processing chain; removing interference due to the N signals from the multiplexed signal; demultiplexing, after the interference due to the N signals is removed, the M signals from the multiplexed signal, thereby generating M detected signals; removing interference due to the M signals from the multiplexed signal; demultiplexing, after the interference due to the M signals is removed, the N signals from the multiplexed signal, thereby generating N detected signals.

BRIEF DESCRIPTION OF THE DRAWINGS

In the accompanying drawings:

FIG. 1 is a block diagram of a conventional diversity receiver in which the signals received by multiple antenna elements are weighted and combined in order to generate an output signal;

FIG. 2 is a block diagram of a conventional spatial-temporal (ST) filtering arrangement;

DETAILED DESCRIPTION OF THE INVENTION

Figure 3:
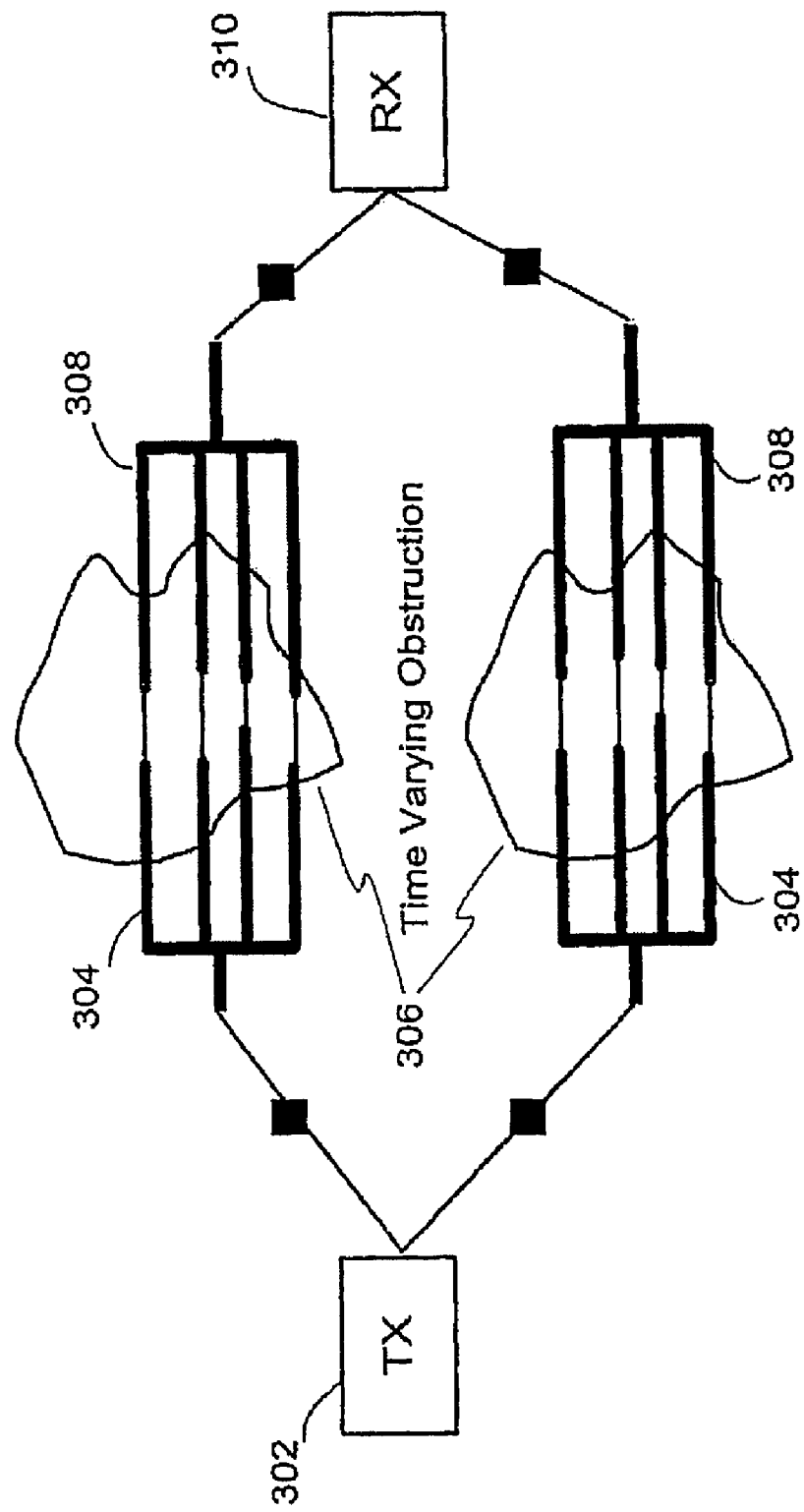
FIG. 3 is a representation of a multiple-input multiple-output antenna arrangement within a wireless communication system.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

The present invention according to several embodiments allows K signal channels associated with K respective antenna elements to be orthogonally multiplexed onto a signal processing chain of a receiver using less than K orthogonal sequences. As a consequence, a receiver using a single receive chain characterized by a spreading factor of N, which would otherwise be limited to N antenna elements, may incorporate more than N antenna elements; thus increasing the capacity of the receiver.

The present invention is applicable to mobile devices and also infrastructure elements (e.g., base stations and access points). In addition, the present invention is applicable to nearly all known wireless standards and modulation schemes (e.g., GSM, CDMA2000, WCDMA, WLAN, fixed wireless standards, OFDM and CDMA). As will be described below, various advantages offered by the present invention derive from the multiplexing of the signals received from a number of antenna elements onto a common receive chain processing path in order to reduce overall power consumption and cost.

In order to facilitate appreciation of the principles of the invention, a brief overview of various conventional multi-element antenna systems designed to mitigate delay spread, interference and fading effects is provided with reference to FIGS. 1-4.

Referring first to FIG. 1, shown is a block diagram of a conventional diversity receiver 100 in which the signals received by multiple antenna elements are weighted and combined in order to generate an output signal. Shown in the conventional diversity receiver 100 are a collection of M antenna elements 102, and coupled with each respective antenna element are parallel receive chains 104, 106, 108 that include respective weighting portions 110, 112, 114. The receive chains 104, 106, 108 all couple with a combiner 116 disposed to produce a combined single 118.

An array of M antenna elements generally provides an increased antenna gain of "M." Such an array also provides a diversity gain against multipath fading dependent upon the correlation of the fading among the antenna elements. In this context the antenna gain is defined as the reduction in required receive signal power for a given average output signal-to-noise ratio (SNR), while the diversity gain is defined as the reduction in the required average output SNR for a given bit error rate (BER) with fading.

For interference mitigation, each of the M antenna elements 102 are weighted at the respective weighting portions 110, 112, 114 and combined in the combiner 116 to maximize signal-to-interference-plus-noise ratio (SINR). This weighting process is usually implemented in a manner that minimizes mean squared error, and utilizes the correlation of the interference to reduce the interference power.

Turning now to FIG. 2, a block diagram is shown of a conventional spatial-temporal (ST) filtering arrangement 200. Shown are a first antenna 202 and a second antenna 204 respectively coupled to a first linear equalizer 206 and a second linear equalizer 208. Outputs of each of the first and second linear equalizers 206, 208 are coupled to a combiner 210, and an output of the combiner 201 is coupled to an MLSE/DFE portion 212.

The filtering arrangement of FIG. 2 is designed to eliminate delay spread using joint space-time processing. In general, since the CCI is unknown at the receiver, optimum space-time (ST) equalizers, either in the sense of a minimum mean square error (MMSE) or maximum signal-to-interference-plus-noise ratio (SINR), typically include a whitening filter. For example, linear equalizers (LE) 206, 208 that whiten the CCI both spatially and temporally, and the filtering arrangement of FIG. 2 are typical of such systems. As shown in FIG. 2, the linear equalizers (LE) 206, 208 are followed by a non-linear filter that is represented by the MLSE/DFE portion 212, which is implemented using either a decision feedback equalizer (DFE) or maximum-likelihood sequence estimator (MLSE).

As is known to one of ordinary skill in the art, the turbo principle can also be used to replace the non-linear filters with superior performance, but higher computational complexity. Using ST processing (STP) techniques, SNR gains of up to 7 dB and SINR gains of up to 21 dB have been reported with a modest number of antenna elements.

Referring next to FIG. 3, shown is a generic representation of a multiple-input/multiple-output antenna arrangement within a wireless communication system 300. Shown are a transmitter (TX) 302 coupled to multiple transmit antennas 304, which are shown transmitting a signal via time varying obstructions 306 to multiple receive antennas 308 coupled to a receiver (RX) 310.

In addition to multiple-input/multiple-output antenna (MIMO) arrangements, other antenna arrangements may be categorized, based upon the number of "inputs" and "outputs" to the channel linking a transmitter and receiver, as follows:

Single-input/single-output (SISO) systems, which include transceivers (e.g., mobile units and a base station) with a single antenna for uplink and down link communications.

Multi-input/single-output (MISO) systems, which include one or more receivers, which downlink via multiple antenna inputs, and one or more transmitters, which uplink via a single antenna output.

Single-input/multi-output (SIMO) systems, which include one or more receivers, which downlink via a single antenna input, and one or more transmitters, which uplink via multiple antenna outputs.

One aspect of the attractiveness of multi-element antenna arrangements, particularly MIMOs, resides in the significant system capacity enhancements that can be achieved using these configurations. Assuming perfect estimates of the applicable channel at both the transmitter and receiver are available, in a MIMO system with M receive antennas the received signal decomposes to M independent channels. This results in an M-fold capacity increase relative to SISO systems. For a fixed overall transmitted power, the capacity offered by MIMOs scale with increasing SNR for a large, but practical, number of M of antenna elements.

In the particular case of fading multipath channels, it has been found that the use of MIMO arrangements permits capacity to be scaled by nearly M additional bits/cycle for each 3-dB increase in SNR. This MIMO scaling attribute is in contrast to a baseline configuration, characterized by M=1, which by Shannon's classical formula scales as one more bit/cycle for every 3-dB of SNR increase. It is noted that this increase in capacity that MIMO systems afford is achieved without any additional bandwidth relative to the single element baseline configuration.

However, widespread deployment of multi-element antenna arrangements in wireless communication systems particularly within wireless handsets) has been hindered by the resultant increase in complexity and associated increased power consumption, cost and size. These parameter increases result, at least in part, from a requirement in many proposed architectures that a separate receiver chain be provided for each antenna element.

One technique which has been developed to utilize multiple antenna elements with a reduced number of signal processing chains includes multiplexing signals from multiple antennas on to a single processing chain as disclosed in a related copending U.S. application Ser. No. 10/606,371, entitled REDUCED-COMPLEXITY ANTENNA SYSTEM USING MULTIPLEXED RECEIVE CHAIN PROCESSING, filed Jun. 27, 2003, which is assigned to the assignee of the present application and is incorporated herein by reference in its entirety.

Figure 4:
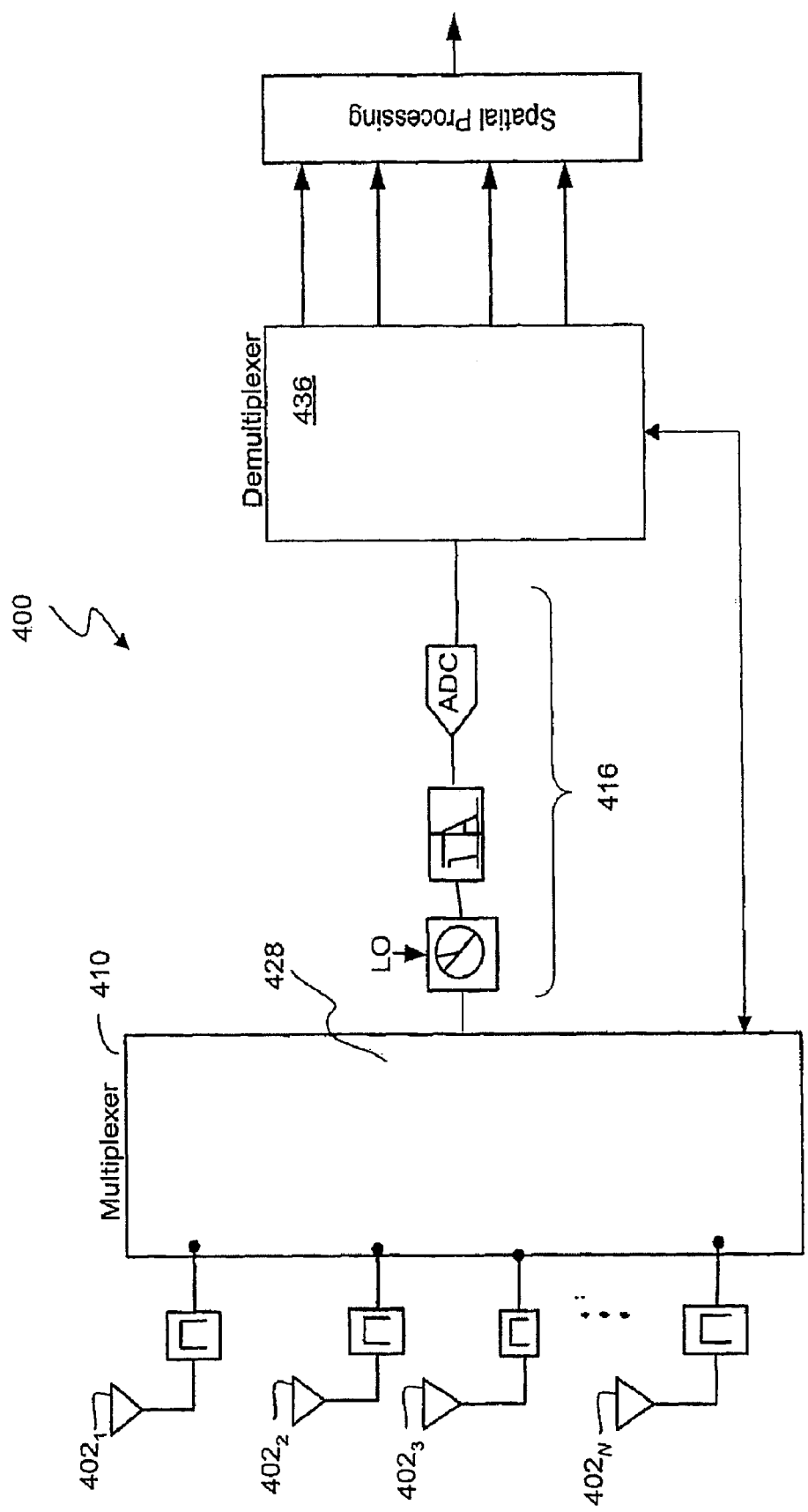
FIG. 4 is a block diagram of an antenna processing system configured to reduce the number of separate signal processing chains associated with an antenna array.

Referring next to FIG. 4, shown is an antenna processing system 400 configured to reduce the number of separate signal processing chains associated with an antenna array in accordance with the above-identified U.S. application Ser. No. 10/606,371. As shown, the antenna processing system 400 includes N antennas 402, 404, 406, 408 coupled to a multiplexer 410, which is coupled to a single signal processing chain 416. The multiplexer 410 is configured to orthogonally multiplex N channels (corresponding to the N antennas 402 onto the signal processing chain 416, and is characterized by a spreading factor of N: that is, the multiplexer 410 utilizes N orthogonal sequences of length N.

In operation, each of the N antennas 402 receives an incident RF signal at spatially distinct locations and provides a replica of the incident RF signal to the multiplexer 410. As a consequence, the multiplexer 410 receives N replicas of the incident RF signal The multiplexer 410 then orthogonally multiplexes the N replicas of the incident RF signal on to the single processing chain 416 to form a multiplexed signal comprising N multiplexed channels. Because each of the N channels is assigned a different orthogonal code during multiplexing, a manageable level of interference exists between the N multiplexed channels within the signal processing chain 416.

Once provided to the signal processing chain 416, the multiplexed signal is then frequency downconverted, filtered and converted from analog form into a digital multiplexed signal. The digital multiplexed signal is then demultiplexed by a demultiplexor 436 into N separate signals that correspond to the N replicas of the signal received at the N antennas. The N separate signals are then subjected to conventional spatial processing.

Although the antenna processing system 400 provides substantial cost and power savings over systems employing a separate signal processing chain for each antenna, in some applications it would be desirable if the antenna processing system 400 could support more than N channels, i.e., more than N antennas. Because each of the N orthogonal sequences is already used by one of the N antennas, however, an additional channel multiplexed onto the signal processing chain 416 would not be orthogonal to at least one of the N multiplexed channels. As a consequence, the additional channel would both impart deleterious interference on one or more of the N multiplexed channels and receive substantial interference from at least one of the N multiplexed channels.

Overview

As is described in further detail below, the iterative multi-stage detection technique of the present invention may be utilized to provide a cost effective means to increase the capacity of wireless systems deploying multi-element antenna arrangements. In one aspect of the invention, an antenna system is configured to orthogonally multiplex K channels onto a single signal processing chain using N orthogonal sequences of length N. The K channels include a first set of N channels and a second set of M channels (the M channels being separate and distinct from the N channels), where K=N+M and in an exemplary embodiment M<N. Therefore, a multiplexed signal is created on the signal processing chain, which includes a first set of N multiplexed channels and a second set of M multiplexed channels.

In accordance with one aspect of the invention, an iterative process is used to receive the multiplexed signal. In a first iteration, interference from the first set of N channels imparted on the second set of M channels is removed from the multiplexed signal, thereby enabling the symbol values associated with the second set of M channels to be reliably estimated. In a second iteration, interference from the second set of M channels imparted on the first set of N channels is removed from the first set of N channels, thereby enabling the symbol values associated with the first set of N channels to be reliably estimated In this way, K channels may be multiplexed on to a single receiver chain with less than K orthogonal sequences, and then reliably estimated after processing (e.g., after down conversion and digitization) by the receiver chain.

Figure 5:
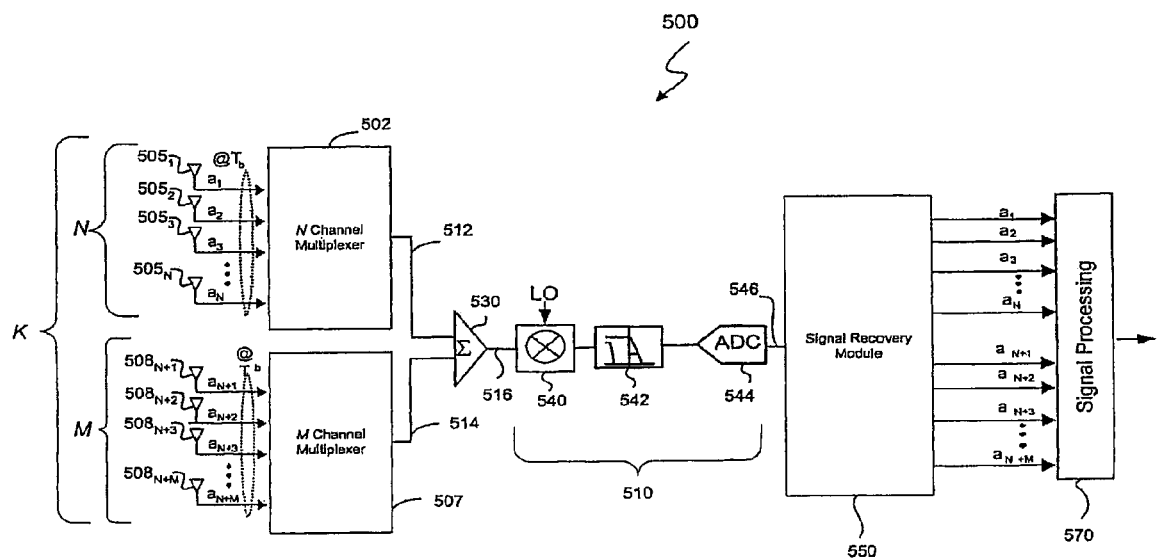
FIG. 5 is a high-level block diagram of a multi-antenna receiver system implemented in accordance with one embodiment of the present invention.
Figure 6:
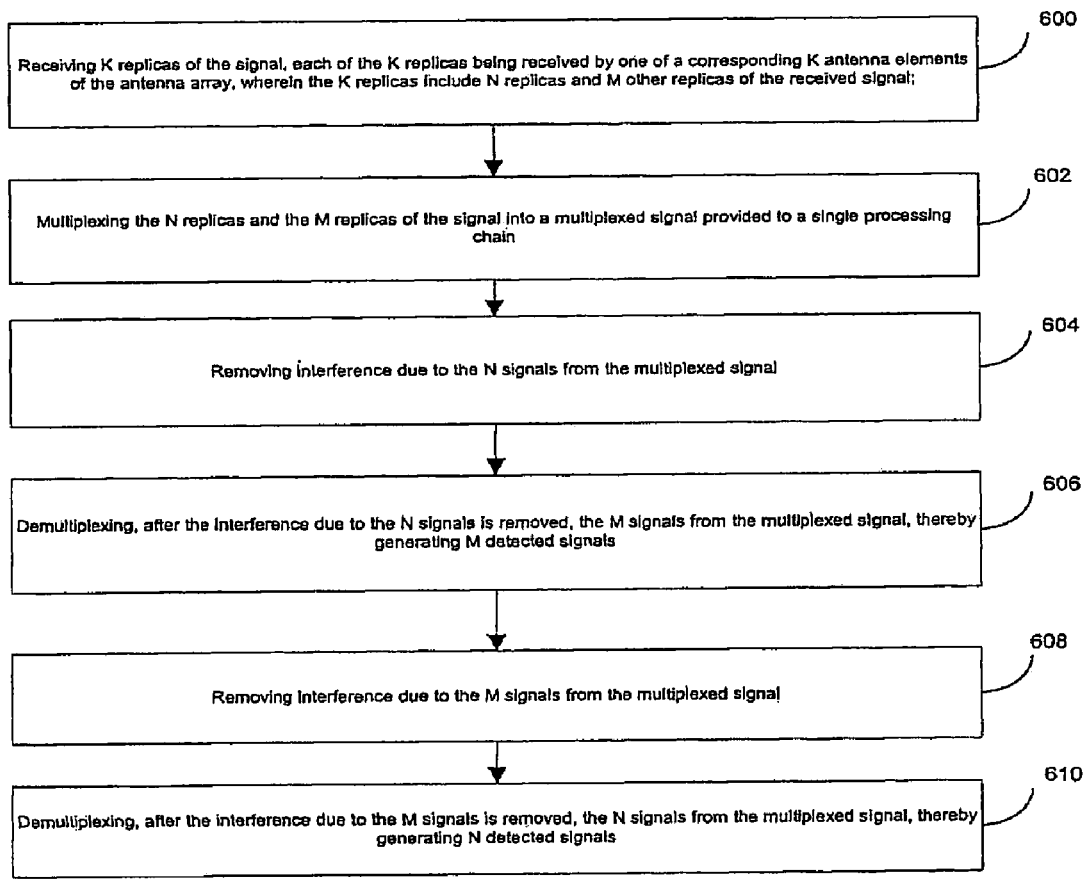
FIG. 6 is a flow chart illustrating steps carried out by the a multi-antenna receiver system of FIG. 5 to receive a signal with multiple antennas according to one embodiment.

Referring next to FIG. 5, shown is a high-level block diagram of a receiver 500 incorporating an antenna system in accordance with an exemplary embodiment of the present invention. While referring to FIG. 5 simultaneous reference will be made to FIG. 6, which is a flow chart illustrating steps carried out by the antenna system 500 to receive a signal with multiple antennas according to the present embodiment. As shown, the antenna system 500 includes an N channel multiplexer 502, and an M channel multiplexer 507. The N channel multiplexer 502 is configured to receive N replicas of a signal with a set of N respective antennas 505, and the M channel multiplexer 507 is configured to receive M replicas of the signal with a set of M respective antennas 508. Collectively the N and M channel multiplexers 502, 507 receive K signal replicas (i.e., K=M+N) (Step 600).

In operation, the N channel multiplexer 502 and the M channel multiplexer 507 collectively multiplex, in cooperation with the summation module 530, the K received signal replicas on to the signal processing chain 510 (Step 602). In an exemplary embodiment, the N channel multiplexer 502 assigns each of the N replicas of the signal a corresponding one of N orthogonal time sequences to form a first composite signal. The N channel multiplexer 502 then overlays a common first PN scrambling sequence on to the first composite signal so as to form a first set of N scrambled signals 512 (also referred to herein as a "first set of N channels" or "set #1 channels").

Similarly, the M channel multiplexer 507 assigns each of M of the N orthogonal sequences to a corresponding one of the M replicas of the signal to form a second composite signal. In other words, the M channel multiplexer 507 reuses a subset of the N orthogonal sequences to form the second composite signal. The second multiplexer 507 then overlays a second PN scrambling sequence on to the second composite signal so as to form a second set of M scrambled signals 514 (also referred to herein as a "second set of M channels" or "set #2 channels"). The summation module 530 then combines the first set of N channels 512 and second set of M channels 514 so as to form a multiplexed signal 516, which is provided to the signal processing chain 510. Within the signal processing chain 510 the multiplexed signal 516 is downconverted by a downconversion module 540 (e.g., a mixer to convert from RF to baseband frequency), filtered by a filter 542 and digitized by an analog to digital converter 544.

Assuming time synchronization is established throughout the antenna system 500, there exists substantially no mutual interference in the processing chain 510 among the first set of N channels. That is, the first set of N channels only experience interference as a consequence of the second set of M channels. The interference power (i.e., in-phase and quadrature phase energy) associated with each channel of the second set of M channels (assuming that useful signal power is normalized by 1) is 1/N. It follows that the total interference power experienced by the first set of N channels is M/N. As long as M remains relatively small compared to N it is possible to make at least preliminary decisions as to the values of the symbols transmitted via the first set of N channels. However, since each channel of the second set of M channels experiences an interference power of N (1/N) or 1 as a consequence of the first set of N channels, the symbol values associated with the second set of M channels may not be directly estimated with any reasonable degree of certainty through straightforward application of conventional techniques.

As shown in FIG. 5, after the multiplexed signal 516 is downconverted, filtered and digitized, the resultant baseband multiplexed signal 546 is provided to a signal recovery module 550. In general, the signal recovery module 550 receives the baseband multiplexed signal 546 and recovers K separate signals, which correspond to the K received signal replicas received by the K antennas.

Initially, the signal recovery module 550 receives the baseband multiplexed signal 546, and removes interference imparted by the first set of N channels on the second set of M channels from the multiplexed signal so as to generate a preliminary estimate of the symbol streams carried by the second set of M channels (Step 604). In an exemplary embodiment, the signal recovery module 550 determines the interference imparted by the first set of N channels upon the second set of M channels by demultiplexing the first set of N channels from the baseband multiplexed signal 546, establishing preliminary values of the symbols received through the first set of N channels and then synthesizing an aggregate interference signal associated with the first set of N channels based upon these preliminary symbol values. The aggregate interference signal also provides an estimate of the symbol streams conveyed via the first set of N channels.

After interference from the first set of N channels is removed from the baseband multiplexed signal 546, the signal recovery module 550 demultiplexes M separate signals (corresponding to the M replicas of the signal) from the preliminary estimate of the second set of M channels (Step 606). Because interference from the first set of N channels is first removed from the baseband multiplexed signal 546 to form the preliminary estimate of the second set of M channels, the signal recovery module 550 may reliably estimate the symbol values associated with the M separate signals.

During a second signal recovery iteration, interference from the second set of M channels is then removed from the estimates of the symbol streams corresponding to the first set of N channels (produced during Step 604) in order to provide a revised estimate of these symbol streams (Step 608). Since the preliminary symbol values of the first set of N channels are initially made in the presence of the interference from the second set of M channels, this step removes the interference originating from the second set of M channels so the symbol values of the first set of N channels maybe more reliably estimated.

The signal recovery module 550 then demultiplexes the revised estimate of the first set of N channels into N separate signals (corresponding to the N replicas of the incident RF signal) from the baseband multiplexed signal 546 (Step 610).

The signal recovery module 550 then provides K separate signals (i.e., the N separate signals and the M separate signals) to a signal processing portion 570 for further processing. The signal processing portion 570 may include additional spatial and iterative (turbo) processing, as well as de-interleaving (bit and/or symbol level) and channel decoding.

Figure 7:
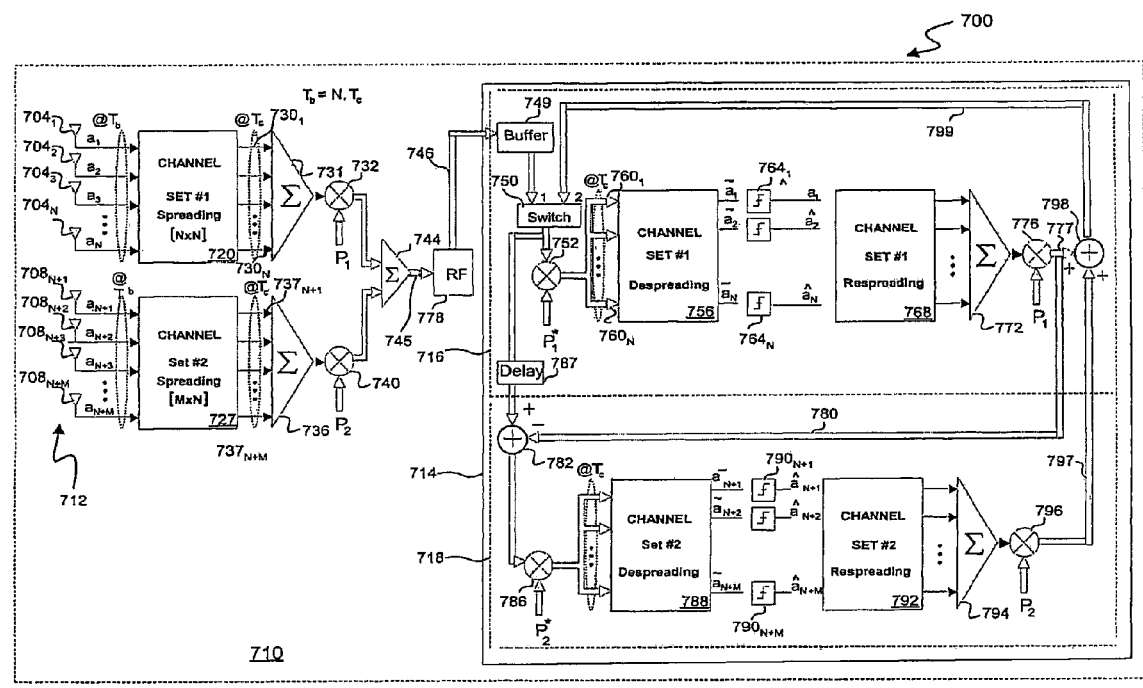
FIG. 7 is a block diagram of a multi-antenna receiver system configured to implement iterative multi-stage detection in accordance with one embodiment of the antenna system of FIG. 5.

Turning now to FIG. 7, a block diagram is provided of a multi-antenna receiver system 700 configured to implement iterative multi-stage detection in accordance with the present invention. The receiver system 700 includes a multistage receiver unit 710 disposed to receive and process RF signal energy collected by a K element antenna array 712. As shown, the receiver system also includes a signal recovery module 714, which functions to separate K multiplexed channels. In this way, K symbol streams received at the K element antenna array 712, and conveyed by the K multiplexed channels, may be separated and recovered at the signal recovery module 714. As shown, the signal recovery portion 714 includes an N channel recovery portion 716 and an M channel recovery portion 718, which cooperate to carry out the functions of the signal recovery module 714. Specifically, the N channel recovery portion 716 in cooperation with the M channel recovery portion 718 function to provide N separate symbol streams and M separate symbol streams, respectively. Together the N separate symbol streams and the M separate symbol streams provide K separate symbol streams that correspond to (e.g., closely estimate) the K symbol streams received at the K element antenna array 712.

As shown, the antenna array 712 includes a first set of N spatially-separated receiving antennas 704 and a second set of M spatially-separated receiving antennas 708. The N antennas 704 and the M antennas 708 couple an RF signal comprised of a first set of N channels and a second set of M channels into the receiver unit 710. The received RF signal is passed through the N antennas 704 to a set #1 channel spreading module 720 and is passed through the M antennas 708 to a channel set #2 spreading module 727. Within the spreading module 720, the N received signal replicas $a_1, a_2, \ldots a_N$ received from the N antenna elements $704_1, 704_2$, and $704_N$ are each spread by a different one of N orthogonal sequences of length N associated with the first set of N channels.

Similarly, within the spreading module 727, the M received signal replicas $a_{N+1}, a_{N+2}, \ldots a_{N+M}$ received from the M antenna elements $70_{N+1}, 708_{N+2}, \ldots 708_{N+M}$ are each spread by a different one of M orthogonal sequences of length N associated with the second set of M channels. A set of N spread signals 730 are provided by the spreading module 720 to a summation module 731 operative to provide a composite set #1 channel signal to a first mixer element 732. In like manner a set of M spread signals 737 are provided by the spreading module 727 to a summation module 736 operative to provide a composite set #2 channel signal to a second mixer element 740.

As shown in FIG. 7, the composite set #1 channel signal is scrambled at the first mixer element 732 using a first PN scrambling sequence $P_1$ and the composite channel set #2 signal is scrambled at the second mixer element 740 using a second PN scrambling sequence $P_2$. The resultant set #1 channel and set #2 channel scrambled signals (also referred to herein as a first set of N channel signals and a second set of M channel signals, respectively) are combined within a summation module 744 in order to form a multiplexed signal 745 which includes the first set of N channel signals and a second set of M channel signals. Within an RF processing module 778 the multiplexed signal 745 is filtered, down-converted from RF, and digitized to reform the multiplexed signal 745 as a baseband multiplexed signal 746 composed from received samples at baseband frequencies.

The baseband multiplexed signal 746 output of the RF processing module 778 is provided to a buffer 749 in the signal recover module 714, and the buffer 749 is switchably coupled to a baseband mixer element 752 via a switch 750.

As shown, the complex conjugate $P_1^*$ of the first PN scrambling sequence $P_1$ is also applied to the baseband mixer element 752 which, in cooperation with a set #1 channel despreading module 756, serves to despread the received first set of N channel signals. In particular, within the despreading module 756 the complex conjugates of each of the N orthogonal time sequences are each used to complete the despreading of the N baseband signal streams 760 received from the baseband mixer element 752. That is, each of the N baseband signals is despread by one of the N orthogonal time sequences. In an exemplary embodiment, the despreading module 756 includes a bank of N complex correlators which are matched to the N channels in the first set of N channels. The set of N despread baseband signals from the despreading module 756 are then passed through a corresponding set of N threshold detectors 767, which yields an initial estimate of the current symbol values for each of the received first set of N channel signals (i.e., $\hat{a}_1, \hat{a}_2, \ldots, \hat{a}_N$).

In accordance with the invention, the estimated symbol values $\hat{a}_1, \hat{a}_2, \ldots, \hat{a}_N$ for the first set of N channel signals are used to synthesize an interference signal intended to replicate the baseband signal waveform of the received first set of N channel signals. Specifically, the estimated symbol values $\hat{a}_1, \hat{a}_2, \ldots, \hat{a}_N$ of first set of N channel signals are processed by a re-spreading module 768 operative to spread each such value using the applicable one of the N orthogonal time sequences. The resultant re-spread set of N channel signals are then combined within a summation module 772 in order to produce a composite re-spread signal. As shown, the composite re-spread signal is scrambled within mixer element 776 using the first PN sequence $P_1$, thereby yielding a regenerated set of N channel signals 777, which is provided as an interference signal 780 to a difference element 782 in the M channel recovery portion 718. The regenerated set of N channel signals 777 is also provided to an adder element 798 for use during a second iteration.

The difference element 782 is arranged to receive the interference signal 780 for the first set of N channels and the baseband multiplexed signal 746 from the delay element 787. The output of difference element 782, which approximates the baseband signal waveform of the second set of M channel signals, is descrambled by mixer element 786 using the complex conjugate $P_2^*$ of the second PN sequence $P_2$. The resultant descrambled signal is then despread within the despreading module 788 by each of the M orthogonal time sequences associated with the second set of M channels. In an exemplary embodiment, the despreading module 788 includes a bank of M complex correlators which are matched to the M channels in the first set of M channels. The resulting set of M despread baseband signals from the despreading module 788 are applied to a set of M threshold detectors 790, which yield estimates of current symbol values $\hat{a}_{N+1}, \hat{a}_{N+2}, \ldots, \hat{a}_{N+M}$ for each of the second set of M channel signals. The estimated symbol values $\hat{a}_{N+1}, \hat{a}_{N+2}, \ldots, \hat{a}_{N+M}$ of the second set of M channel signals are processed by a second respreading module 792 operative to spread each such value using the applicable one of the M orthogonal time sequences (i.e., the subset of the N orthogonal sequences used by the channel set #2 spreading module 727). The resultant re-spread set of M channel signals are then combined within a summation module 794 in order to produce a second composite re-spread signal. As shown, the second composite re-spread signal is scrambled within mixer element 796 using the second PN sequence $P_2$, thereby yielding a regenerated set of M channel signals 797, which is provided to an adder element 798.

As a consequence, K separate estimated symbol values, i.e., the estimated symbol values $\hat{a}_1, \hat{a}_2, \ldots, \hat{a}_N$ of first set of N channel signals and the estimated symbol values $\hat{a}_{N+1}, \hat{a}_{N+2}, \ldots, \hat{a}_{N+M}$ of the second set of M channel signals, are provided during a first iteration.

The adder element 798 combines the regenerated set of N channel signals 777 and the regenerated set of M channel signals 797 to form a regenerated baseband multiplexed signal 799, which according to an exemplary embodiment, is processed during a second iteration as discussed herein to produce a more accurate set of K separate symbol values.

The iterative interference removal process will be better understood with a brief consideration of the effect of spreading and scrambling the N and M signal replicas received at the N antennas 505 and the M antennas 508, respectively. To begin, suppose $\{W_i | i=1,2, \ldots, N\}$ designate the N binary orthogonal time sequences used in spreading the first set of N channel signals. The $i^{th}$ of the sequences may be expressed as $W_i = (w_{i,1}, w_{i,2}, \ldots, w_{i,N})$, where $w_{i,m}$ designates the $m^{th}$ chip of the sequence $W_i$. Note that each of the sequences $W_i$ is independent of the symbol index, since each sequence repeats from one symbol to the next. Next, suppose that $\{P_n | i=1,2\}$ designate the first and second PN scrambling sequences that overlay the time orthogonal sequences of the first set of N channel signals and the second set of M channel signals. Although the first and second PN sequences $P_1$ and $P_2$ do not repeat, the symbol index may also be removed from the PN sequences since the signal processing of concern is memoryless. That is, detection of a current symbol does not involve signal samples from previous and future symbols. Consequently, each of the PN sequences may be expressed as $P_n=(p_{n,1}, p_{n,2}, \ldots, p_{n,N})$. The resulting composite sequences for channel i (i=1,2, . . . ,N) and channel N+k (k=0,2, . . . ,M) are denoted $(\alpha_{i,1},\alpha_{i,2}, \ldots, \alpha_{i,N})$ and $(\beta_{i,1},\beta_{i,2}, \ldots, \beta_{i,N})$, respectively, with $\alpha_{i,m}=w_{i,m}p_{1,m}$ and $\beta_{k,m}=w_{k,m}p_{2,m}$ for m=1,2, . . . , N.

Since it will be desired to divide the power of the synthesized interference signal evenly over the in-phase and quadrature components of the useful signal (irrespective of carrier phases), complex-valued PN sequences are considered; that is, the chips $p_{n,m}$ randomly assume values from the set {exp(jπ/2), exp(−jπ/2), exp(j3π/2), exp(−j3π/2)}.

Figure 8:
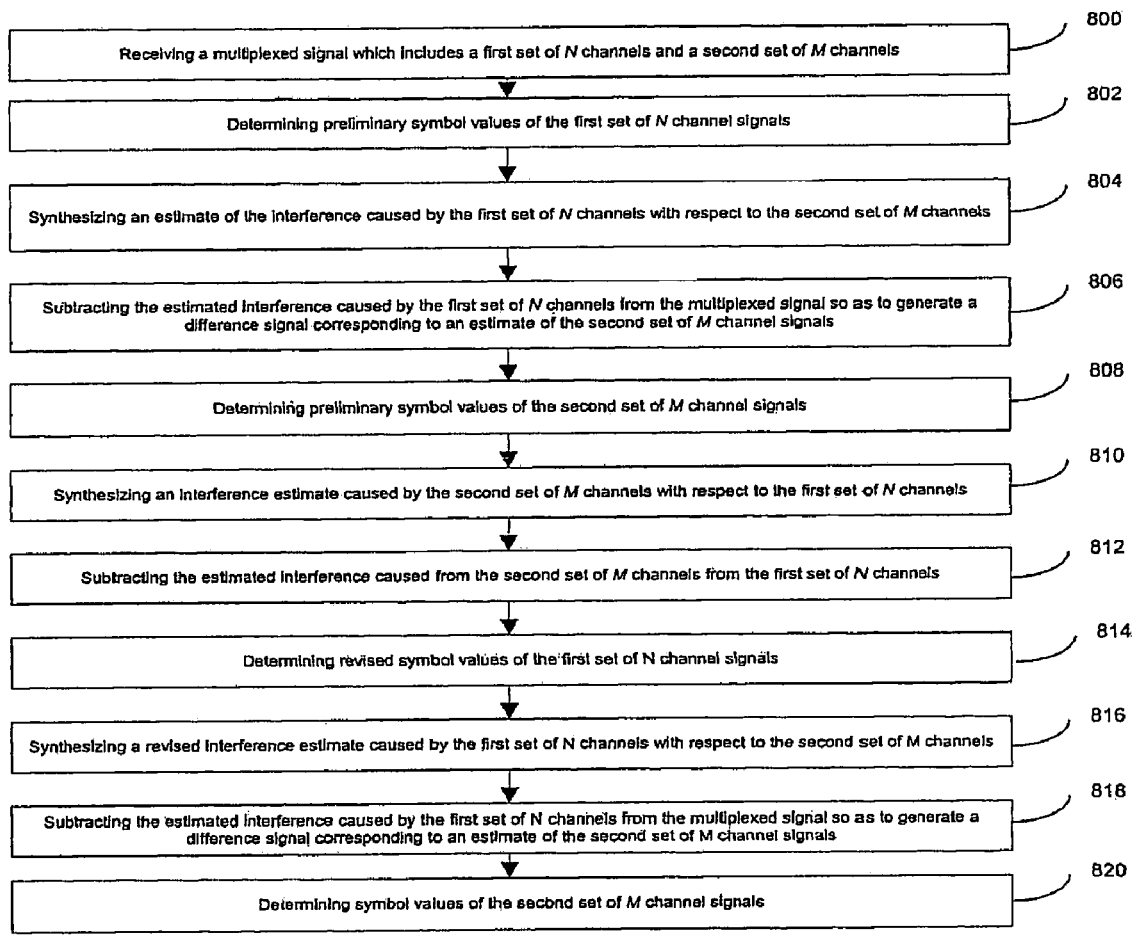
FIG. 8 is a flowchart depicting steps carried out by the multi-antenna receiver system of FIG. 7 when carrying out the iterative multistage detection process according to one embodiment of the present invention.
Figure 9:
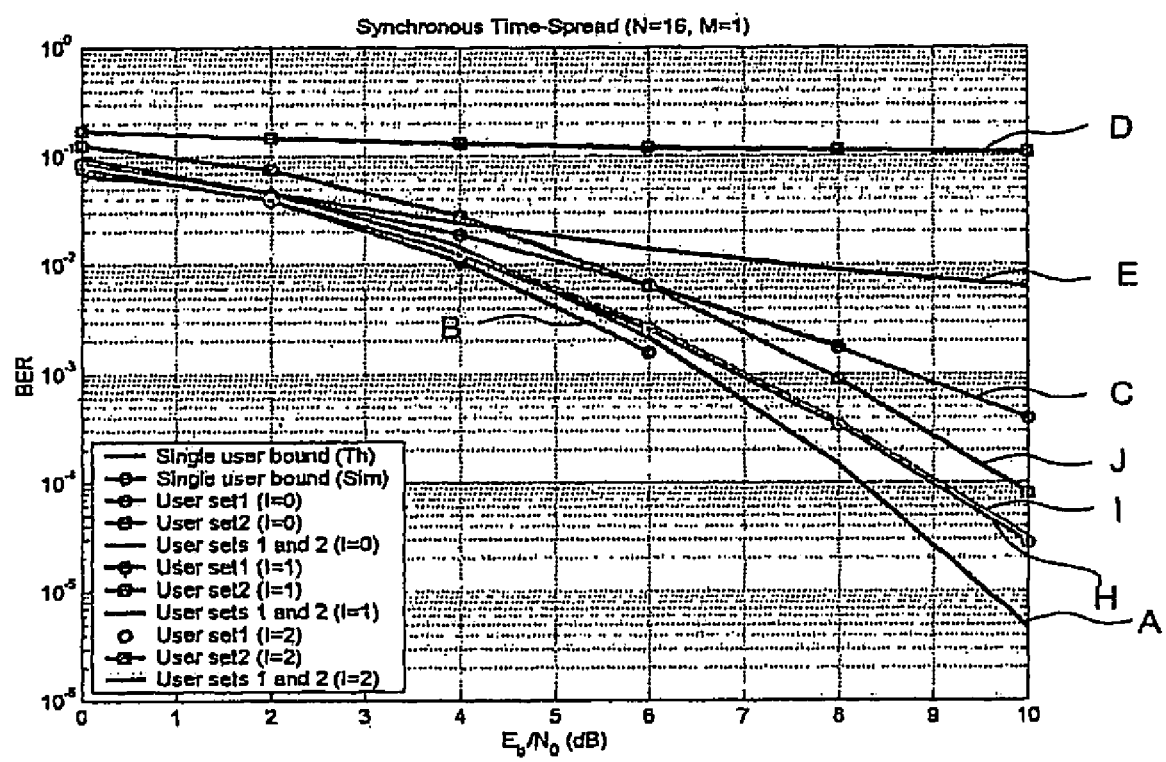
FIG. 9 is a graph depicting simulated results of the iterative multistage detection process carried out by the multi-antenna receiver system of FIG. 7 with a spreading factor of (N) selected to be 16 and a number of channels selected to be N+1.
Figure 10:
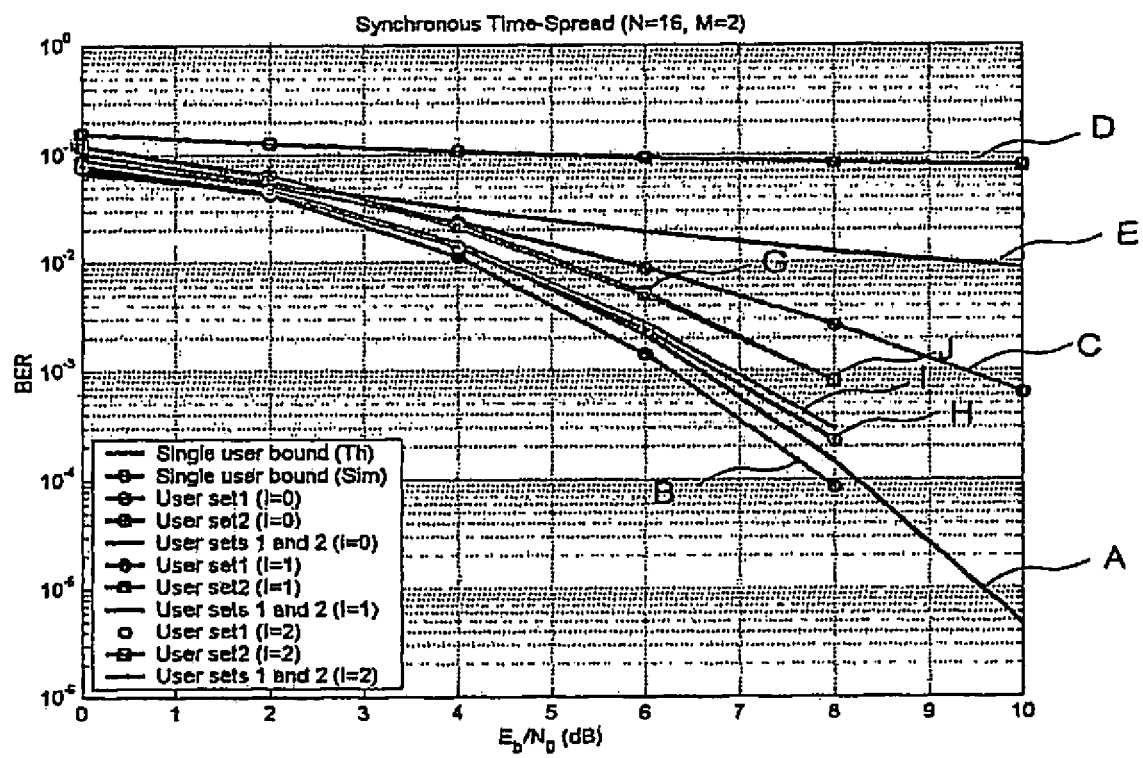
FIG. 10 is a graph depicting simulated results of the iterative multistage detection process carried out by the multi-antenna receiver system of FIG. 7 with a spreading factor of (N) selected to be 16 and a number of channels selected to be N+2.
Figure 11:
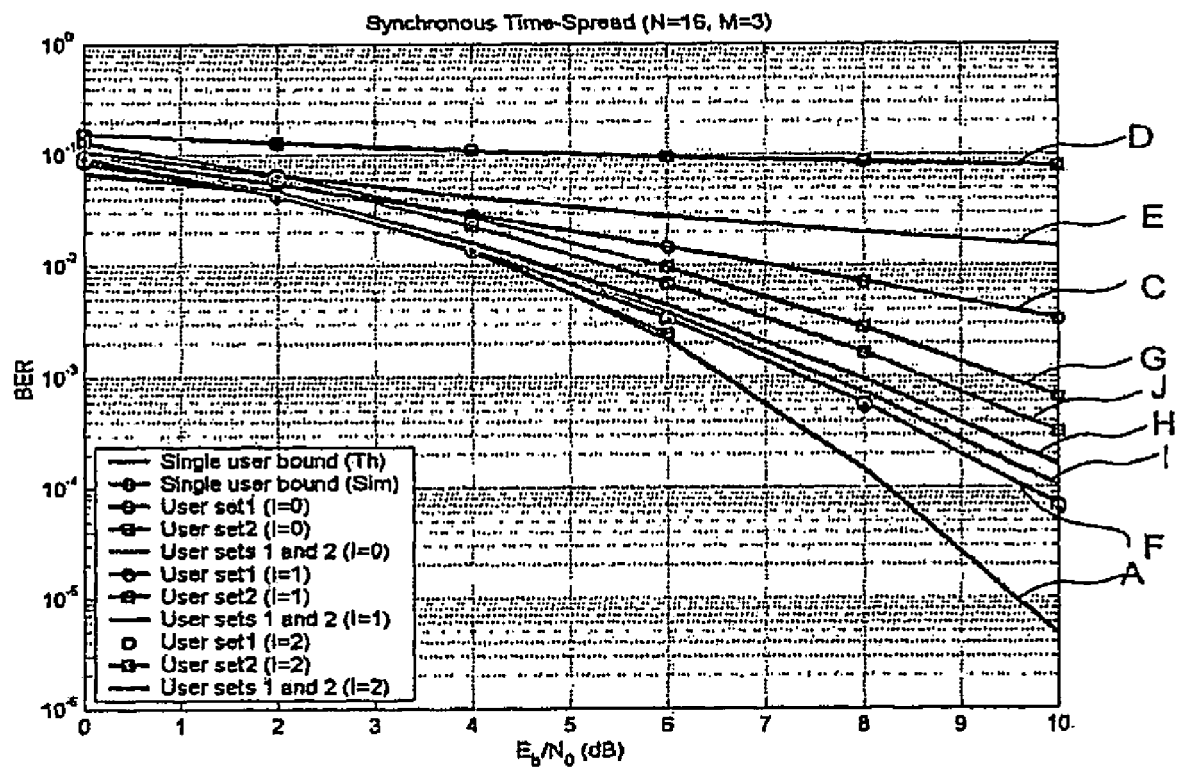
FIG. 11 is a graph depicting simulated results of the iterative multistage detection process carried out by the multi-antenna receiver system of FIG. 7 with a spreading factor of (N) selected to be 16 and a number of channels selected to be N+3.
Figure 12:
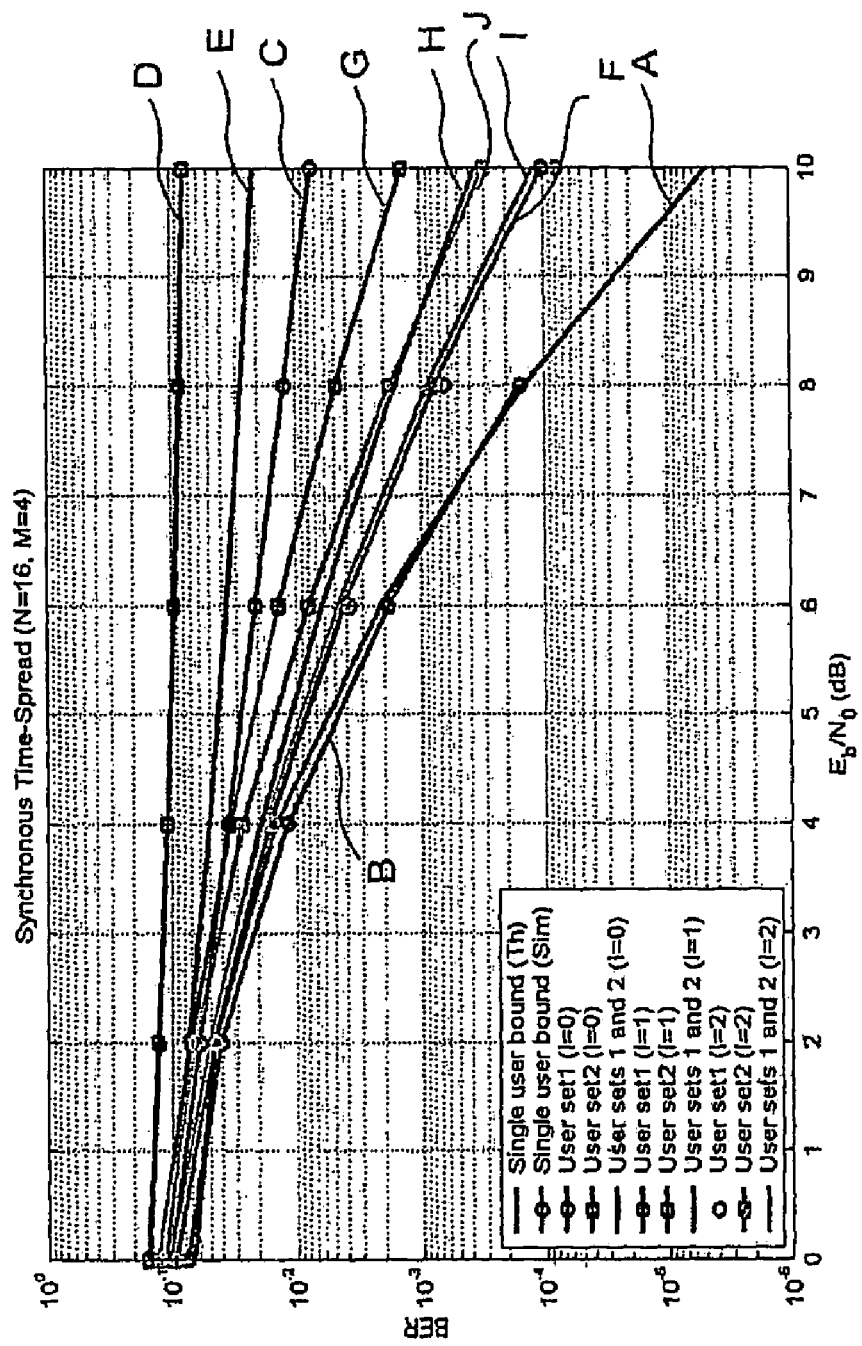
FIG. 12 is a graph depicting simulated results of the iterative multistage detection process carried out by the multi-antenna receiver system of FIG. 7 with a spreading factor of (N) selected to be 16 and a number of channels selected to be N+7.
Figure 13:
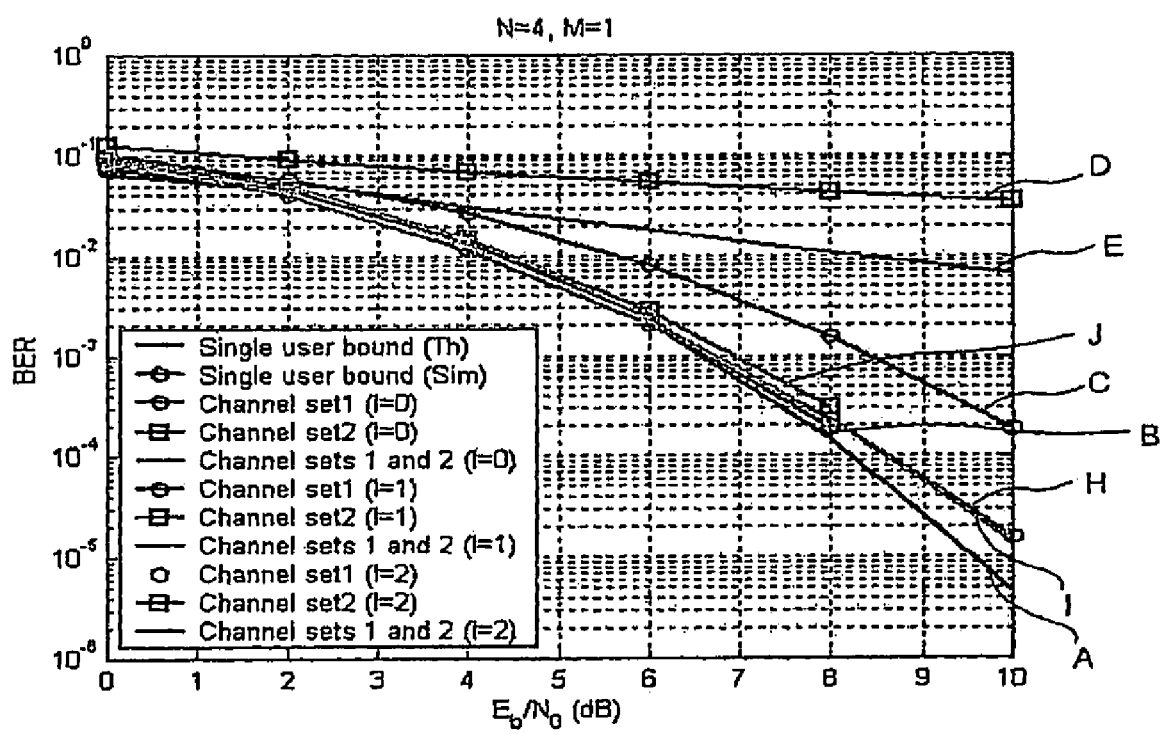
FIG. 13 is a graph depicting simulated results of the iterative multistage detection process carried out by the multi-antenna receiver system of FIG. 7 with a spreading factor of (N) selected to be 7 and a number of channels selected to be N+1.

Referring next to FIG. 8, shown is a flowchart depicting steps carried out by the multi-antenna receiver system 700 when carrying out the iterative multistage detection process according to one embodiment of the present invention.

As mentioned earlier, the interference affecting first set of N channels is limited. Accordingly, initial estimates of the symbol values of the first set of N channel signals may be made using a threshold detector immediately following despreading by the corresponding composite chip sequences (Step 802). This step of the detection process yields the following set of set of initial decisions for the first set of N channel signals: $\hat{a}_1, \hat{a}_2, \ldots, \hat{a}_N$.

The initial decisions $\hat{a}_1, \hat{a}_2, \ldots, \hat{a}_N$ are then used to synthesize an estimated interference caused by the first set of N channels with respect to the second set of M channels (Step 804). This estimated interference is then subtracted from the baseband signal energy of the multiplexed signal (Step 806), thereby yielding a difference signal corresponding to an estimate of the second set of M channel signals (at baseband). Assuming each of the second set of M channels may be identified by an index N+k (k=1,2, . . . ,M), the total interference from the first set of N channels may be expressed as:

$$I_{N+k} = \frac{1}{N} \sum_{i=1}^{N} a_i \left[ \sum_{j=1}^{N} (\alpha_{i,j} \beta_{k,j}^*) \right] \quad (1)$$

where $a_i$ is the data symbol of the $i^{th}$ channel during the current symbol interval. Each term in the outer sum in (1) represents the interference from one of the N channels. Since the chip sequences $(\alpha_{i,1},\alpha_{i,2}, \ldots, \alpha_{i,N})$ and $(\beta_{i,1},\beta_{i,2}, \ldots, \beta_{i,N})$ are known to the receiver, $I_{N+k}$ can be estimated once the symbol decisions corresponding to channels 1 to N of the first set of N channels have been made. This estimate $I_{N+k}$ is subtracted from the corresponding signal at a correlator output before sending the result to a threshold detector.

After the estimated interference caused by the first set of N channels is removed from the multiplexed signal, the symbol values of the received second set of M channel signals are estimated using the threshold detector 790 immediately following despreading by the despreading module 788 (Step 808). This step of the detection process yields the following set of symbol decisions for the second set of M channel signals: $\hat{a}_{N+1}, \hat{a}_{N+2}, \ldots, \hat{a}_{N+M}$.

If all initial decisions $\hat{a}_1, \hat{a}_2, \ldots, \hat{a}_N$ for the first set of N channel signals are made correctly at Step 802, complete interference cancellation effectively occurs at Step 806 and substantially no mutual interference between the first set of N channels and the second set of M channels will remain when the symbol values of the second set of M channel signals are estimated at Step 808. Each incorrect decision with regard to $\hat{a}_1, \hat{a}_2, \ldots, \hat{a}_N$ yielded in Step 802 will, however, cause the corresponding term in $I_{N+k}$ to increase and thereby reduce the likelihood of accurate estimation of the second set of M channels.

In an exemplary embodiment, to improve the accuracy of detection of the symbols conveyed by the second set of M channels, a second iteration of may be performed. Specifically, the symbol decisions $\hat{a}_{N+1}, \hat{a}_{N+2}, \ldots, \hat{a}_{N+M}$ for the second set of M channels in the first iteration are used to synthesize interference of the second set of M channel signals (Step 810). The interference of the second set of M channels is then subtracted from the first set of N channel signals (Step 812).

During the first iteration, the baseband multiplexed signal 746 produced by the RF processing module 778 is buffered within buffer 749 and directly coupled therefrom to the mixer element 752 via switch 750. During the second and any subsequent iterations, the switch 750 is set to couple the regenerated baseband multiplexed signal 799 from the output of adder element 798 (obtained from mixer elements 776 and 796) to the baseband mixer element 752, while the while the buffer 749 is filled with the incoming signal received from RF processing module 778. Ideally, all iterations are performed while the buffer 749 is updated and completed before the buffer contents has been filled with a new RF signal. In other words, the iterative processing is done within one bit interval (i.e., within one bit duration), so that the size of the buffer 749 remains manageable. In an exemplary embodiment, the iterative processing is performed in a much shorter period than a bit duration, and when the buffer 749 is filled with a new set of bit samples, the processing of the new set of bit samples by the signal recovery module 714 begins.

The interference from the second set of M channels in the $k^{th}$ channel signal (k=1,2, . . . ,N) is given by:

$$I_k = \frac{1}{N} \sum_{i=1}^{N} a_{N+i} \left[ \sum_{j=1}^{N} (\beta_{i,j} \alpha_{k,j}^*) \right] \quad (2)$$

This interference is synthesized by substituting $\hat{a}_{N+i}$ for $a_{N+i}$ in Equation (2) above for i=1,2, . . . ,M. Since $\hat{a}_{N+i}=a_{N+i}$ with a probability close to 1, the synthesized replica will generally be virtually identical to the actual interference.

In an exemplary embodiment, during a second iteration, the regenerated baseband multiplexed signal 799 is descrambled and despread by the baseband mixer element 752 and the set #1 channel despreading module 756 to provide N despread baseband signals. The synthesized interference due to the second set of M channel signals (determined during the first iteration) from Step 810 is then subtracted from the $k^{th}$ signal of the set of N despread baseband signals at the output of the despreading module 756; thus effectively subtracting the interference of the second set of M channels from the first set of N channel signals (Step 812).

The N interferenced-reduced signals produced by subtracting the synthesized interference from the $k^{th}$ signal of the set of N despread baseband signals is passed to the applicable threshold detector 767. This process is repeated for all of the first set of N channels to determine a revised set of N symbol values of the first set of N channel signals (Step 814).

A revised estimate of the interference caused by the first set of N channels with respect to the second set of M channels is then determined based upon the a revised set of symbol values (Step 816). In an exemplary embodiment, the revised symbol values of the first set of N channel signals are respread by the re-spreading module 768, recombined within the summation module 772 and scrambled within mixer element 776 using the first PN sequence $P_1$, thereby producing another interference signal 780, which is subtracted from the regenerated baseband multiplexed signal at the difference element 782 so as to generate a difference signal corresponding to an estimate of the second set of M channel signals (Step 816).

Symbol value decisions for the second set of M channels are then made during the second iteration following subtraction of the interference of the first set of N channels (Step 818). In this regard the total interference experienced by the $k^{th}$ channel of the second set of M channels (i.e., channel N+k) is given by Equation (1). After subtracting the best available estimate of this total interference, the output of the despreading module 788 for the $k^{th}$ channel of the second set of M channels is sent to the corresponding set of M threshold detectors 790, which produces a revised set of M symbol values of the first set of M channel signals.

Thus, after the second iteration, a revised set of N symbol values of the first set of N channel signals and a revised set of M symbol values of the second set of M channel signals is provided by the signal recovery portion 714. Together such revised symbol values provide K separate symbol values, which correspond to K symbol streams in the K received signal replicas received at the K element antenna array 712.

It has been found when the number of excess channels M is limited to approximately 25% of the spreading factor N, execution of two or three iterations yields sufficiently good performance that additional iterations are unnecessary. As the number of excess channels M approaches 25% of N, performance has been found to be improved through execution of additional iterations.

Simulation Results

FIGS. 9-13 depict the results of various simulations of the above-described iterative multi-stage detection process using two sets of orthogonal spreading sequences. In FIGS. 9-12 a spreading factor N of 16 was employed, while in FIG. 13 a spreading factor N of 7 was utilized. The number of "excess" channels M was selected to be 1, 2, 3 and 7 in FIGS. 9-12, respectively, and M was chosen to be 1 in the case of FIG. 13. In addition, the simulations were executed exclusively at baseband (no modulation or spectrum-shaping filtering were simulated), and an AWGN channel and synchronous operation (i.e., synchronous time spread) were assumed.

Referring to FIGS. 9-13, trace A represents the theoretical single user bound while trace B represents the performance of a single, uncoded channel (i.e., as "single user bound") obtained through simulation. In addition, trace C represents the BER of the first set of N channels prior to the performance of interference cancellation, trace D represents the BER of the second set of M channels prior to interference cancellation, and trace E illustrates the overall BER (i.e., both the first set of N and the second set of M channels) prior to interference cancellation. The BER of the first set of N channels following the first iteration of interference cancellation is represented by trace F, the BER of the second set of M channels following the first iteration of interference cancellation is represented by trace G, and the overall BER following the first iteration of interference cancellation is illustrated by trace H. Finally, the BER of the first set of N channels following the second iteration of interference cancellation is represented by trace I, the BER of the second set of M channels following the second iteration of interference cancellation is represented by trace J, and the overall BER following the second iteration of interference cancellation is illustrated by trace K.

Although the simulations represented by FIGS. 9-13 demonstrate the effectiveness of certain embodiments the inventive iterative multi-stage detection technique, a value N of 16 (which results in deployment of at least 16 antennas) may be impractical in certain applications. However, FIG. 13 demonstrates the effectiveness of the inventive technique under currently practical conditions (i.e., N=7, M=1).

In the simulations of FIGS. 9-13, complex PN scrambling sequences were utilized. Specifically, the proposed $\pi/2$-separated complex scrambling sequence symbols were replaced with symbols separated by $\pi/7$ intervals. Other simulations based upon real-valued PN scrambling sequences have not been found to yield performance of similar BER.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

For example, an exemplary embodiment was described wherein a symbol level procedure was performed to remove the interference due to the second set of M channel signals from the first set of N channel signals at the correlator outputs of despreading module 756. It should be recognized that in an alternative embodiment, interference due to the second set of M channel signals from the first set of N channel signals may be removed at the chip level using a difference element as was done to remove the interference due to the first set of N channels from the second set of M channel signals using the difference element 782.

Moreover, in the described exemplary embodiment, interference due to the first set of N channel signals was removed from the second set of M channel signals at the chip level using the difference element 782. In an alternative embodiment, interference due to the first set of N channel signals may be removed from the second set of M channel signals on the symbol level at a correlator output after the despreading module 788. In other words, interference from either the first set of N channels or the second set of M channels may be removed at either the chip or the symbol level and still be well within the scope of the present invention.

What is claimed is:

1. A method for multiplexing K channels on to a receiver chain, the K channels including N channels corresponding to N antenna elements and M channels corresponding to M antenna elements, the method comprising:

spreading each of the N channels according to a corresponding one of N orthogonal sequences so as to form N spread channels;

overlaying a first scrambling sequence onto the N spread channels so as to form a first set of N channels;

spreading each of the M channels according to one of the N orthogonal sequences so as to form M spread channels;

overlaying a second scrambling sequence on to the M spread channels so as to form a second set of M channels;

combining the first set of N channels and the second set of M channels so as to form K multiplexed channels; and providing the K multiplexed channels to the receiver chain.

2. The method according to claim 1, comprising orthogonally multiplexing said K multiplexed channels to the receiver chain.

3. The method according to claim 1, comprising:
generating a first composite signal comprising N orthogonal sequences derived from the N channels; and
scrambling the first composite signal to generate said first set of N channel signals.

4. The method according to claim 3, comprising:
generating a first composite signal comprising M orthogonal sequences derived from the M channels, wherein the M orthogonal sequences are a subset of the N orthogonal sequences; and
scrambling the first composite signal to generate said second set of M channel signals.

5. The method according to claim 1, comprising combining said first set of N channel signals and said second set of M channel signals to generate said K multiplexed channels.

6. The method according to claim 1, comprising downconverting via the receiver chain, the K multiplexed channels to corresponding baseband multiplexed channels.

7. The method according to claim 6, comprising generating K separate signals from said downconverted baseband multiplexed channels.

8. The method according to claim 1, comprising canceling interference due to the first set of N channels from the second set of M channels.

9. The method according to claim 1, comprising canceling interference due to the second set of M channels from the first set of N channels.

10. A system for multiplexing K channels on to a receiver chain, the K channels including N channels corresponding to N antenna elements and M channels corresponding to M antenna elements, the system comprising:
at least one processor that spreads each of the N channels according to a corresponding one of N orthogonal sequences so as to form N spread channels;
said at least one processor enables overlaying a first scrambling sequence onto the N spread channels so as to form a first set of N channels;
said at least one processor spreads each of the M channels according to one of the N orthogonal sequences so as to form M spread channels;
said at least one processor overlays a second scrambling sequence on to the M spread channels so as to form a second set of M channels;
said at least one processor combines the first set of N channels and the second set of M channels so as to form K multiplexed channels; and
said at least one processor provides the K multiplexed channels to the receiver chain.

11. The system according to claim 10, wherein said at least one processor orthogonally multiplexes said K multiplexed channels to the receiver chain.

12. The system according to claim 10, wherein said at least one processor:
generates a first composite signal comprising N orthogonal sequences derived from the N channels; and
scrambles the first composite signal to generate said first set of N channel signals.

13. The system according to claim 12, wherein said at least one processor:
generates a first composite signal comprising M orthogonal sequences derived from the M channels, wherein the M orthogonal sequences are a subset of the N orthogonal sequences; and
scrambles the first composite signal to generate said second set of M channel signals.

14. The system according to claim 10, wherein said at least one processor combines said first set of N channel signals and said second set of M channel signals to generate said K multiplexed channels.

15. The system according to claim 10, wherein said at least one processor downconverts via the receiver chain, the K multiplexed channels to corresponding baseband multiplexed channels.

16. The system according to claim 15, wherein said at least one processor generates K separate signals from said downconverted baseband multiplexed channels.

17. The system according to claim 10, wherein said at least one processor cancels interference due to the first set of N channels from the second set of M channels.

18. The system according to claim 10, wherein said at least one processor cancels interference due to the second set of M channels from the first set of N channels.

19. A system for multiplexing K channels on to a receiver chain, the K channels including N channels corresponding to N antenna elements and M channels corresponding to M antenna elements, the system comprising:
one or more circuits that spreads each of the N channels according to a corresponding one of N orthogonal sequences so as to form N spread channels;
said one or more circuits enables overlaying a first scrambling sequence onto the N spread channels so as to form a first set of N channels;
said one or more circuits spreads each of the M channels according to one of the N orthogonal sequences so as to form M spread channels;
said one or more circuits overlays a second scrambling sequence on to the M spread channels so as to form a second set of M channels;
said one or more circuits combines the first set of N channels and the second set of M channels so as to form K multiplexed channels; and
said one or more circuits provides the K multiplexed channels to the receiver chain.

20. The system according to claim 19, wherein said one or more circuits orthogonally multiplexes said K multiplexed channels to the receiver chain.

21. The system according to claim 19, wherein said one or more circuits:
generates a first composite signal comprising N orthogonal sequences derived from the N channels; and
scrambles the first composite signal to generate said first set of N channel signals.

22. The system according to claim 21, wherein said one or more circuits:
generates a first composite signal comprising M orthogonal sequences derived from the M channels, wherein the M orthogonal sequences are a subset of the N orthogonal sequences; and scrambles the first composite signal to generate said second set of M channel signals.

23. The system according to claim 19, wherein said one or more circuits combines said first set of N channel signals and said second set of M channel signals to generate said K multiplexed channels.

24. The system according to claim 19, wherein said one or more circuits downconverts via the receiver chain, the K multiplexed channels to corresponding baseband multiplexed channels.

25. The system according to claim 24, wherein said one or more circuits generates K separate signals from said downconverted baseband multiplexed channels.

26. The system according to claim 19, wherein said one or more circuits cancels interference due to the first set of N channels from the second set of M channels.

27. The system according to claim 19, wherein said one or more circuits cancels interference due to the second set of M channels from the first set of N channels.

* * * * *